No. 810,287. PATENTED JAN. 16, 1906.
J. E. LALLY.
HORSE EVENER.
APPLICATION FILED JUNE 28, 1905.
2 SHEETS—SHEET 1.
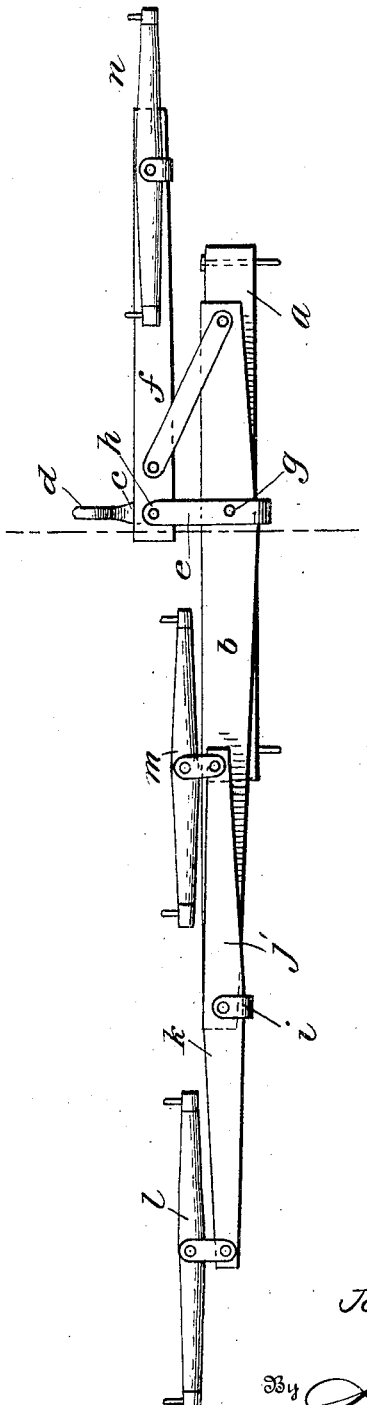
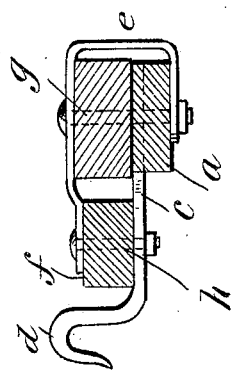
Inventor:
John Edward Lally,
Witnesses:

No. 810,287. PATENTED JAN. 16, 1906.
J. E. LALLY.
HORSE EVENER.
APPLICATION FILED JUNE 28, 1905.
2 SHEETS—SHEET 2.
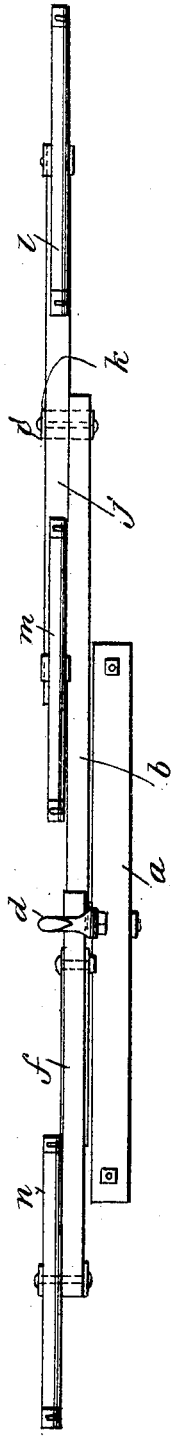
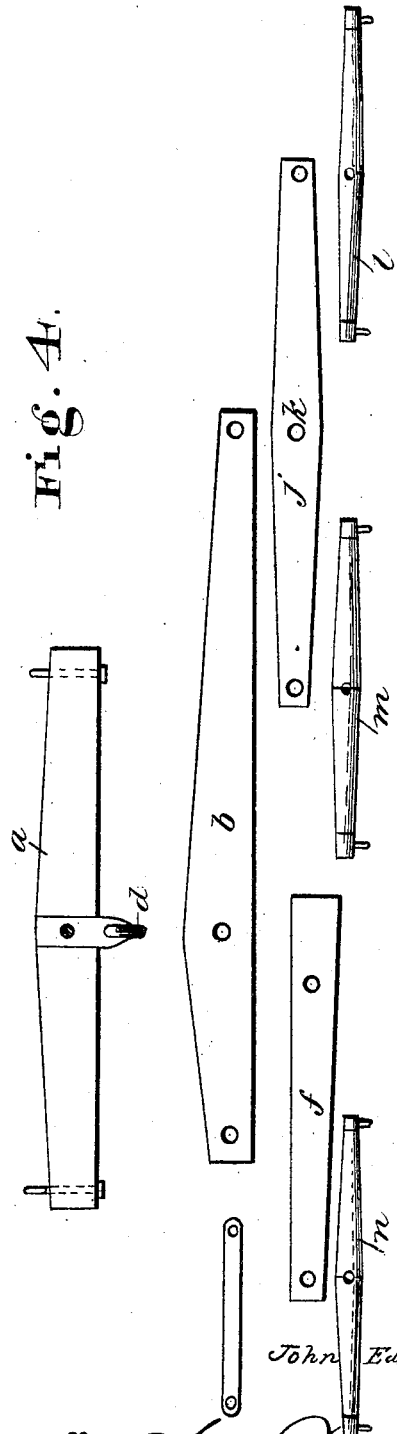
Witnesses:
Inventor
John Edward Lally.
By
Attorneys.

UNITED STATES PATENT OFFICE.

JOHN EDWARD LALLY, OF FRANKFORT, KANSAS.

HORSE-EVENER.

No. 810,287.  Specification of Letters Patent.  Patented Jan. 16, 1906.

Application filed June 28, 1905. Serial No. 267,370.

*To all whom it may concern:*

Be it known that I, JOHN EDWARD LALLY, a citizen of the United States, residing at Frankfort, in the county of Marshall and State of Kansas, have invented certain new and useful Improvements in Horse-Eveners, of which the following is a specification.

This invention has relation to a draft-evener for use on a cultivator, corn-plow, or other farm implement, the device being limited to the use of three horses hitched in a line side by side.

It is the object of the invention to employ a system of levers of simplified construction and arrangement which will insure even draft for a three-horse hitch that may be made to be employed directly upon the implement or connected to the latter through the intermediary of a tongue.

It is, moreover, the object of my invention to provide a three-horse evener in which a so-called "base-bar" may be arranged to carry a major portion of the draft devices and hold them above a row of corn which they are desired to span or straddle, the base-bar serving in a way as a tongue to a wagon to hold the various parts thereon up to place, so that the said "various parts" may have the draft thereon evened or divided between the several horses.

Reference is to be had to the annexed drawings, forming a part of this specification, of which drawings—

Figure 1 is a plan view of the various parts organized for attachment to the implement or tongue of the same. Fig. 2 is a front edge view of the same. Fig. 3 is a sectional view taken on the line 3 3 of Fig. 1, showing the hook and binding clevis or connections. Fig. 4 represents the various levers and devices disconnected and which are shown assembled in Figs. 1 and 2.

Similar letters of reference indicate similar parts wherever they occur.

In the drawings, $a$ designates the base-bar, upon which the body portion of the lead-bar $b$ rests and between which and the lead-bar the shank $c$ of the hook $d$ passes. A clevis or binding-clip $e$ passes from beneath the base-bar, behind the same, and over the lead-bar $b$ and the inner end of the equalizer-bar $f$, as is clearly shown in Fig. 3. A king-bolt $g$ is passed through the binding-clevis $e$, the lead-bar, base-bar, and shank $c$ of the hook $d$, securing the same firmly together, and a bolt $h$ is passed through the forward end of the upper arm of the binding-clevis, the inner end of the equalizer-bar, and the shank of the hook $d$, securing these parts together all at the center of the base-bar $a$. The base-bar carries and in a measure balances almost all of the balance of the devices and holds them up to place much as would the tongue of a wagon. The hook $d$ being connected in advance of the other parts operates to hold up the said parts when the horses stop or the parts supported by the base-bar become slack, so that they are kept from dropping down on the tender corn.

$i$ designates a clevis which connects a doubletree $j$ at its center $k$ to the outer end of the lead-bar, and this doubletree is equipped at its ends with swingletrees $l$ $m$ for hitching two horses thereto.

$f$ designates the equalizing-lever, which, as shown, is bolted at its inner end to the draft-hook shank $c$ and is, moreover, connected to the lead-bar through the medium of the equalizer-strap, extending diagonally from the outer end of the shorter arm of the lead-bar and the inner end of the equalizer-bar. The outer end of the latter bar is provided with a swingletree $n$, which completes the provision of the entire contrivance with three swingletrees, which is all that is designed it shall have—that is to say, it is the purpose of the invention to provide for a three-horse-evener hitch-up, limiting it to this number.

The essential feature of the invention is the base-bar, which provides for hitching directly to a vehicle or attaching the invention to a vehicle or implement or cultivator through the medium of a pole or tongue, the base-bar insuring the evening of the draft in any case, as well as the binding and holding together of the parts.

The binding-clevis and the manner of securing the shank of the draft-hook in place is important to the invention as contributing to compactness, strength, and rigidity of parts.

I claim—

In a three-horse evener of the character described, the combination of the base-bar, the lead-bar and its equipments secured on the base-bar, the draft-hook and its shank, the latter extending between said bars, the equalizer-bar supported on the shank of the draft-hook, the binding-clevis, a bolt securing the base-bar and lead-bar and shank of the draft-hook together and a bolt connecting the inner end of the equalizer-bar and shank of the draft-hook.

In testimony whereof I affix my signature in presence of two witnesses.

JOHN EDWARD LALLY.

Witnesses:
 FORREST WARREN,
 F. M. HARTMAN.